(12) United States Patent
Maeda

(10) Patent No.: US 12,439,162 B1
(45) Date of Patent: Oct. 7, 2025

(54) MODULAR OMNIDIRECTIONAL IMAGING SYSTEM AND METHOD FOR VEHICLE VISIBILITY, RECORDING, AND COMMUNICATION

(71) Applicant: Rydeen North America, Inc., Torrance, CA (US)

(72) Inventor: Philip Maeda, Torrance, CA (US)

(73) Assignee: Rydeen North America, Inc., Torrance, CA (US)

( * ) Notice: Subject to any disclaimer, the term of this patent is extended or adjusted under 35 U.S.C. 154(b) by 0 days.

(21) Appl. No.: 18/920,377

(22) Filed: Oct. 18, 2024

Related U.S. Application Data

(60) Provisional application No. 63/601,955, filed on Nov. 22, 2023, provisional application No. 63/544,661, filed on Oct. 18, 2023.

(51) Int. Cl.
| | |
|---|---|
| *H04N 23/698* | (2023.01) |
| *H04N 23/51* | (2023.01) |
| *H04N 23/90* | (2023.01) |

(52) U.S. Cl.
CPC .......... *H04N 23/698* (2023.01); *H04N 23/51* (2023.01); *H04N 23/90* (2023.01)

(58) Field of Classification Search
CPC .................................................. H04N 23/698
See application file for complete search history.

(56) References Cited

U.S. PATENT DOCUMENTS

2018/0032830 A1* 2/2018 Kim .................... G06F 3/04845

\* cited by examiner

*Primary Examiner* — Y Lee
(74) *Attorney, Agent, or Firm* — Schwartz Law Firm, P.C.

(57) ABSTRACT

A system for capturing omnidirectional imaging data includes a sensor unit, an array of two or more digital cameras, and a processor. The digital cameras are each adapted for capturing subspherical imaging data. The processor is operatively connected to the array of digital cameras and is adapted for combining the subspherical imaging data into spherical imaging data. The sensor unit is detachably mounted to an intermediate mounting member. The intermediate mounting member includes a substantially hollow body and a battery pack. The intermediate mounting member is detachably mounted to a base bracket.

1 Claim, 6 Drawing Sheets

MODULAR OMNIDIRECTIONAL IMAGING SYSTEM AND METHOD FOR VEHICLE VISIBILITY, RECORDING, AND COMMUNICATION

TECHNICAL FIELD AND BACKGROUND OF THE DISCLOSURE

The present disclosure relates broadly and generally to a video capture, monitoring, recording, and communication system and apparatus for vehicles.

Fisheye cameras have a wide field of view (FOV) that allows them to capture a large area of the surrounding environment in a single image. This makes them ideal for applications such as monitoring large areas from a single point of capture. Certain models of GoPro7 cameras make use of a type of fisheye cameras and are popular for capturing action sports footage. Additionally, security camera systems often use fisheye cameras to monitor a wide view of the surrounding area from a single viewpoint.

The primary obstacle to overcome in rendering views from fisheye cameras is the distortion present in the video or images they capture. This can make it difficult to identify objects or people because of distortion from the true image. However, there are a number of existing techniques that can be used to correct for this distortion. Such image filtering methods can be used to present the wide-angle video data in a "flattened" manner so that the appearance of stretching and compressing is minimized.

Visibility around vehicles, especially large commercial vehicles, has been a persistent issue in the transportation industry. Blind spots around the vehicle create danger for travelers and costly accidents with far-reaching economic impacts. The use of mirror and camera systems have helped increase driver visibility, but the problem of blind spots persist. Not only is visibility required, but also recording and communication is needed for training intervention and investigation.

SUMMARY OF EXEMPLARY EMBODIMENTS

Various exemplary embodiments of the present disclosure are described below. Use of the term "exemplary" means illustrative or by way of example only, and any reference herein to "the invention" is not intended to restrict or limit the invention to exact features or steps of any one or more of the exemplary embodiments disclosed in the present specification. References to "exemplary embodiment," "one embodiment," "an embodiment," "various embodiments," and the like, may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

It is also noted that terms like "preferably", "commonly", and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

According to one exemplary embodiment, the present disclosure comprises a modular sensor unit mounting and communication apparatus for vehicle monitoring, recording, and communication. A sensor unit containing one or more components to measure the surrounding environment, such as a digital camera, radar, lidar, ultrasonic, proximity, photosensor, humidity, vibration, gyroscopic, temperature, pressure, airspeed, motion, gas detection, acceleration, microphone, compass, hall effect, or GPS sensor is detachably mounted to an intermediate mounting member, which is in turn detachably mounted to a base bracket. In addition to linking together mechanically, the sensor unit, intermediate mounting member, and base bracket link together with electrical circuitry for power and communication and can be networked with the vehicle=s data bus to receive vehicle status information. The intermediate mounting member and base attachment enable additional system features for the sensor unit by incorporating accessory components such as battery packs, wireless transmitters, receivers, transceivers, and more.

According to another exemplary embodiment, the present disclosure comprises a fisheye camera sensor and housing adapted for mounting on the side of a vehicle, such as a heavy truck, to capture hemispherical imaging data and process it to present dewarped and flattened imaging data.

According to another exemplary embodiment, the present disclosure comprises an array of fisheye camera sensors collocated in a single housing adapted for mounting on the fender of a vehicle to capture a subspherical imaging data set. When the subspherical imaging data set is stitched together through image processing software, spherical imaging data is created, providing an omnidirectional view of the area surrounding the system. This spherical imaging data can them be further processed to dewarp the data into a cylindrical image band and finally flatten the cylindrical image band for display to a user in a format compatible with a flat screen. As used herein, Asubspherical imaging data@ refers to imaging data captured from any camera device that cannot capture imaging data omnidirectionally, such that imaging data from multiple such camera devices would have to be combined in a stitching process to yield spherical imaging data.

According to another exemplary embodiment, the present disclosure comprises an array of fisheye camera sensors collocated in a single rearview mirror housing adapted for mounting on the interior of a vehicle windshield to capture a subspherical imaging data set. When the subspherical imaging data set is stitched together through image processing software, spherical imaging data is created, providing an omnidirectional view of the vehicle interior as well as the exterior area through the vehicle windshield and windows. This spherical imaging data can them be further processed to dewarp the data into a cylindrical image band and finally flatten the cylindrical image band for display to a user in a format compatible with a flat screen.

According to another exemplary embodiment, the present disclosure comprises a modular sensor unit mounting and communication apparatus for vehicle monitoring, recording, and communication with local area wireless network data connection to other like devices and surrounding infrastructure.

As used herein, the term Afisheye camera@ refers broadly to a digital image capture sensor employing a wide-angle lens to capture a broader view of the surroundings. Some fisheye camera sensors employ lenses which can provide a field of view up to 180 degrees and even greater than 180-degrees. The term Ahemispherical imaging data@ refers to imaging data gathered in the dome-like capture zone which fully encircles the fisheye lens in a 360-degree azimuth, and sweeps approximately 180-degrees from horizon to horizon. In terms borrowed from the Horizontal Celestial Coordinate System, the capture area sweeps around the fisheye lens with an azimuth measurement of 360-degrees, and the capture area sweeps approximately 180-degrees in altitude. As used herein, the term Asubspherical imaging data set@ refers to imaging data gathered by multiple digital cameras recording from a central point with overlapping or adjoining fields of view, which together cover all directions surrounding the central point. As used herein, the term Aspherical imaging data@ refers to the omnidirectional imaging data synthesized through data processing from the stitching or combining of a subspherical imaging data set.

As used herein, the term @dewarp@ refers to the process of projecting spherical or hemispherical imaging data onto a developable surface, such as a cylinder. The imaging data captured at the Aequatorial@ viewing angle of 180-degrees is placed tangent to the cylinder, and will, therefore, remain undistorted by scaling of the image onto the surface of the open cylinder. The remaining hemispherical imaging data will have to be stretched to a larger scale to complete the projection onto the cylinder. The amount of stretching/distortion required to project the hemispherical imaging data onto the cylindrical surface increases as distance from the Aequatorial@ tangential circle increases. Once completed, this step will result in the projection of the hemispherical video data onto the interior surface of an open cylinder, forming an axially-facing, cylindrical image band.

As used herein, the term Aflattened@ refers to the process by which the cylindrical image band is flattened for display on a single-plane display. The area presented to a viewer at any one time uses only a portion of the 360-degree imaging data in the file, and horizontal shifting/scrolling of the flattened area allows for selection of any portion of the cylindrical image band. The term Aprocessor@ refers to any device suitable for manipulating electronic data and performing logic and control functions through integrated circuitry.

The term Aoperative connection@ refers to any method or instrumentality that can facilitate data communication between the components of this system and extends to situations where data is passed through another intermediary component to reach the described destination. An operative connection could be accomplished over a variety of different transmission media such as wired cable, optical fiber cable, stripline, microstrip, printed circuit, radio wave, microwave, infrared, or optical and could make use of any data transmission protocol. The term Amemory device@ refers to a device capable of read/write functionality that utilizes a nonvolatile storage method such as flash memory or hard disk to catalog data.

The term Atransmitter@ refers to a device capable of sending data transmissions using radio waves, microwaves, infrared, or optical communication methods, while the term Atransceiver@ refers to a device that can send and receive such data communications. The term Aremote computing device@ refers to a separate programmable machine such as a web server, cloud server, mainframe, programmable logic controller, personal computer, laptop, tablet, phone, smartphone, PDA, gaming system, virtual/augmented reality device, smartwatch, or wearable computer with incorporated means for receiving data input, directly or indirectly from a transmitter.

According to another exemplary embodiment, the location data from a Global Navigation Satellite System (GNSS), such as GPS, GLONASS, BeiDou, or Galileo, and time/date data of the hemispherical imaging data capture is associated with the imaging data captured by the modular sensor unit communication apparatus.

According to another exemplary embodiment, imaging data captured by the modular sensor unit communication apparatus is communicated to a central data repository for a distributed mapping system, such as the one described in US 2022/0390254, which utilizes blockchain entries for the exchange of near real time environmental data from sensors such as the 360-degree video system described in this disclosure.

According to another exemplary embodiment, additional computer vision analysis processing is performed on the spherical imaging data captured by a windshield mounted sensor unit to characterize the behavior of vehicle occupants and recognize their attentiveness. As used herein, the term Acomputer vision analysis@ refers broadly to the digital algorithmic interpretation of the patterns and features found in image and video data for recognition, tracking, categorization, and other operations.

In exemplary embodiments, the present system and method presents imaging data captured with a fisheye camera wherein a hemispherical image is dewarped into a cylindrical band. This cylindrical band is composed of the image data from an upper portion of the hemispherical image, such that the viewing perspective of the images on the cylindrical band is simulated at a point beyond the fisheye camera=s aperture. This perceived elevation shift can be used to present images from a more desirable perspective while maintaining unobtrusive camera placement. The mounting of such a system and incorporation of additional automation and security monitoring features are further described.

BRIEF DESCRIPTION OF THE DRAWINGS

Exemplary embodiments of the present disclosure will hereinafter be described in conjunction with the following drawing figures, wherein like numerals denote like elements.

DESCRIPTION OF EXEMPLARY EMBODIMENTS AND BEST MODE

The present invention is described more fully hereinafter with reference to the accompanying drawings, in which one or more exemplary embodiments of the invention are shown. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention, which is to be given the full breadth of the appended claims and any and all equivalents thereof. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Figure 1:
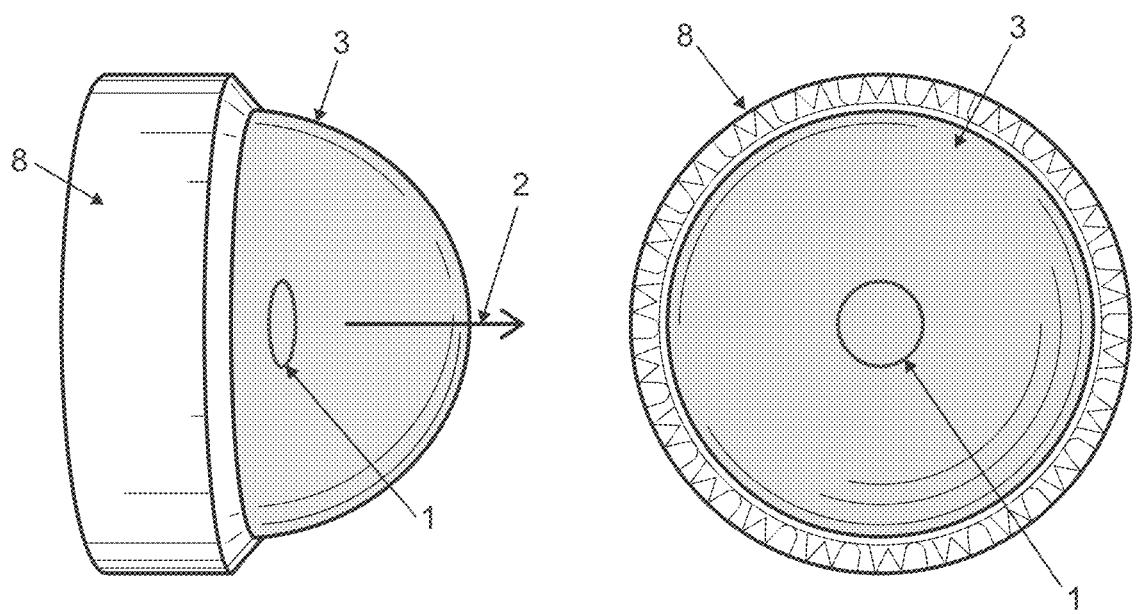
FIG. 1 shows single fisheye camera hardware design.

In exemplary embodiments, the present disclosure comprises a video capture, monitoring, recording, and communication system and apparatus for vehicles. Referring now specifically to FIG. 1, a fisheye camera (1) capable of capturing digital images in a greater than one hundred eighty degree arc in both axes provides visual imaging of a hemispherical area centered on the camera lens. The direction of capture (2) for the fisheye camera is indicated by an arrow. A clear dome enclosure (3) protects the fisheye camera from environmental hazards. It can be constructed out of glass or another hardened transparent material.

Figure 2:
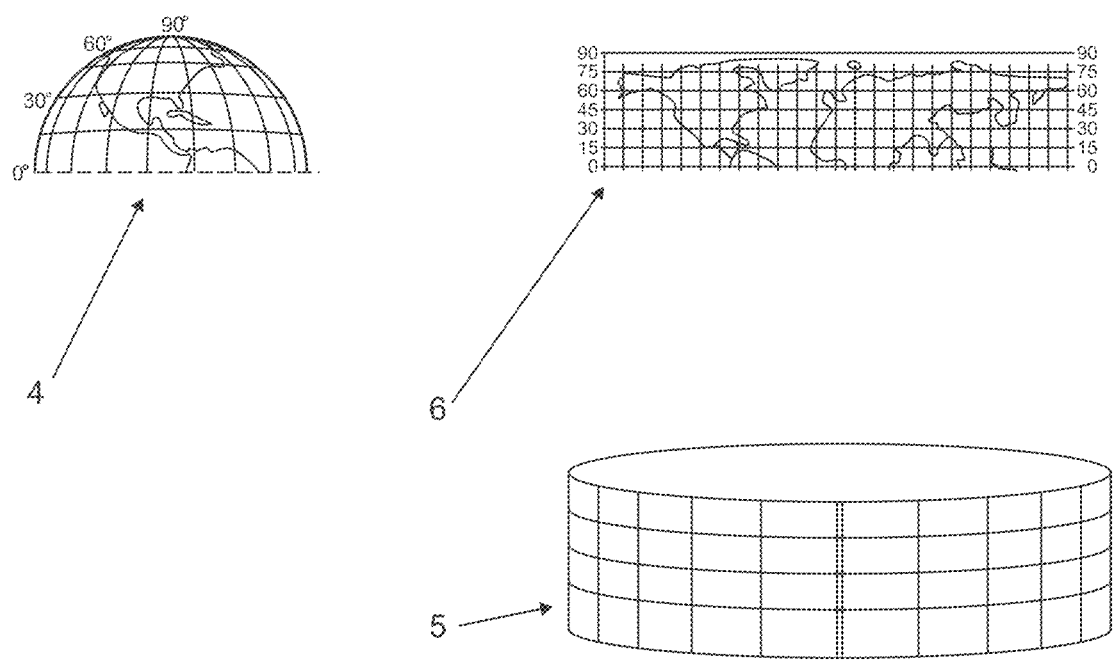
FIG. 2 shows a hemisphere of a globe being dewarped by projection onto the surface of a cylinder, and single plane image can be formed by flattening the cylindrical band.

Referring now specifically to FIG. 2, there is a large amount of distortion present in the raw images captured by a fisheye camera (1). As described in U.S. patent application Ser. No. 18/899,058, which is incorporated here by reference, image processing is required in order to present hemispherical imaging data on a display in a manner that can be easily interpreted by an average user. Much like the projection of the surface of earth=s spherical globe onto a flat map representation, the image processing step of dewarping takes hemispherical imaging data (4) and projects it onto the interior of an open cylinder to form a cylindrical imaging band (5). Next, the image processing step of flattening can be carried out to output single plane imaging data (6). Presentation of this cylindrical image band (5) on a flat display is achieved by flattening the displayed area of the band and scrolling back and forth across band to adjust the area displayed; In total, this provides a view of 360 degrees around the capture point. This presentation mimics the natural action of turning one=s head from side to side to see the 360 degrees of surrounding area, looking at only a section at a time. Looking at video playback in this way, which is easily comprehended by the user, makes this method desirable for hemispherical image data presentation.

Figure 3:
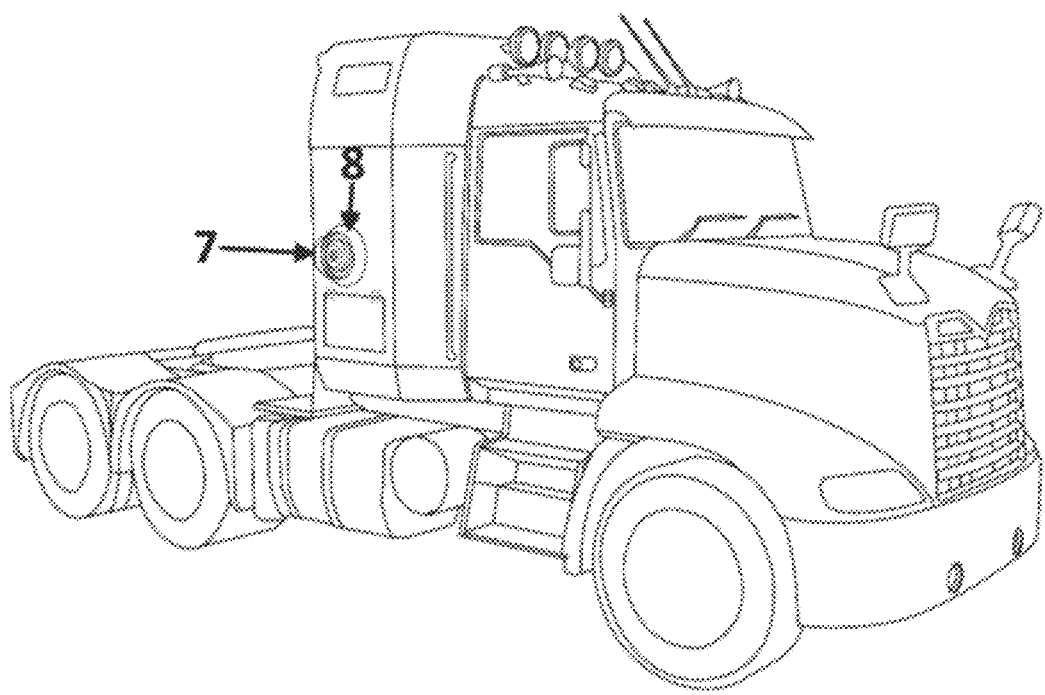
FIG. 3 shows a single fisheye camera located on the passenger side of the tractor unit in a tractor-trailer pair.

Referring now specifically to FIG. 3, one application of such a single fisheye camera system is on the passenger side of the tractor unit in a tractor-trailer pair. The side mounted fisheye camera system (7) is located at a point far enough out from the vehicle to avoid blind spots. This vantage would allow for capture of adjacent lanes where significant blind spots are present. Visibility of the area on the passenger side of a heavy truck is critical to the driver; seeing this area allows for better navigation of lane change and merge maneuvers on the highway. During in-city operation, this camera provides visibility of the area next to the front fender, which can fully conceal pedestrians, cyclists, and other small vehicles. Unbeknownst to drivers, individuals can be caught in this blind spot and injured or killed during right hand turns. Another issue faced during in-city driving is ensuring that the trailer's rear tires clear obstacles such as curbs when making turns. The wide viewing angle of this camera system could maintain vision of the rear trailer wheels even during vehicle articulation. Using computer vision analysis, the view displayed to the driver in the in-cab monitor could automatically track the rear wheels when the vehicle is traveling under a threshold speed and/or the right turn signal is activated. In parking/backing situations, this camera view can be used to judge clearances even when the trailer is articulated at an angle.

Necessary accessory electronics can be housed in the base of the enclosure (8), and wired power and data communication cable can run to a power source and display/modem respectively. Alternatively, the device could wirelessly transmit and receive data. This video data, once dewarped and flattened, could be communicated to the driver in a variety of display types including a typical dash-mounted display (approximately 16×9 aspect ratio), rearview mirror-style wide screen display (approximately 16×11 aspect ratio), or even a heads-up display. The viewing area displayed to the driver could be manually set by the driver or fleet operator or automatically responsive to a combination of vehicle controls (steering input, turn signal, etc.) and vehicle status information (operating gear, vehicle speed, etc.). Such an in-cab display could also contain a camera for driver behavior monitoring and recording.

Figure 4:
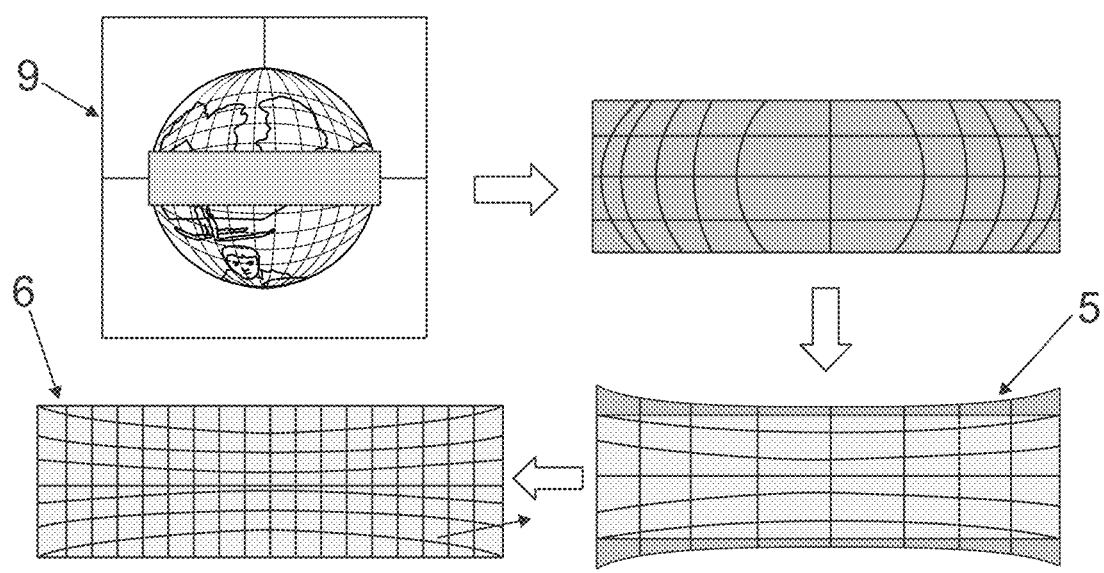
FIG. 4 shows spherical imaging data being dewarped by projection onto the surface of a cylinder, and single plane image can be formed by flattening the cylindrical band.

Referring now specifically to FIG. 4, two fisheye cameras placed back-to-back with a one hundred eighty (180) degree separation angle would provide a combined full image sphere of the surroundings, once stitched together through image processing. In order to deliver an easily digestible video view in such a double fisheye camera system, the same dewarping and flattening image processing is required in order to present this spherical imaging data (9) on a display in a manner that can be easily interpreted by an average user. Unlike the dewarping process for hemispherical imaging data (4) captured from a single fisheye camera (1), spherical imaging data (9) can be oriented at any angle and still provide a circle tangent to the cylinder it will be dewarped onto. Therefore, omnidirectional viewing can be achieved, and the cylindrical image band (5) can be formed Alooking@ in any direction. The synthesis of the two camera's image data into a single image band through stitching can provide a higher potential image resolution than the band generated by the single fisheye camera. The resolution of the flattened single plane image data (6) will vary based on whether the region on the image band being viewed was captured at the center of either fisheye camera=s direction of capture (2) or, instead, at the more outlying regions of the capture area where resolution is lower.

Utilizing a higher number of collocated cameras with overlapping fields of view would allow for increased image quality and resolution once stitched together using image processing software. Three such cameras could be arranged in a plane with one hundred twenty degrees separation. Four such cameras could be arranged in a tetrahedral configuration, with one hundred nine and a half degrees separation from the other cameras. Six such cameras could be arranged with ninety degrees of separation between each neighboring camera.

Figure 5:
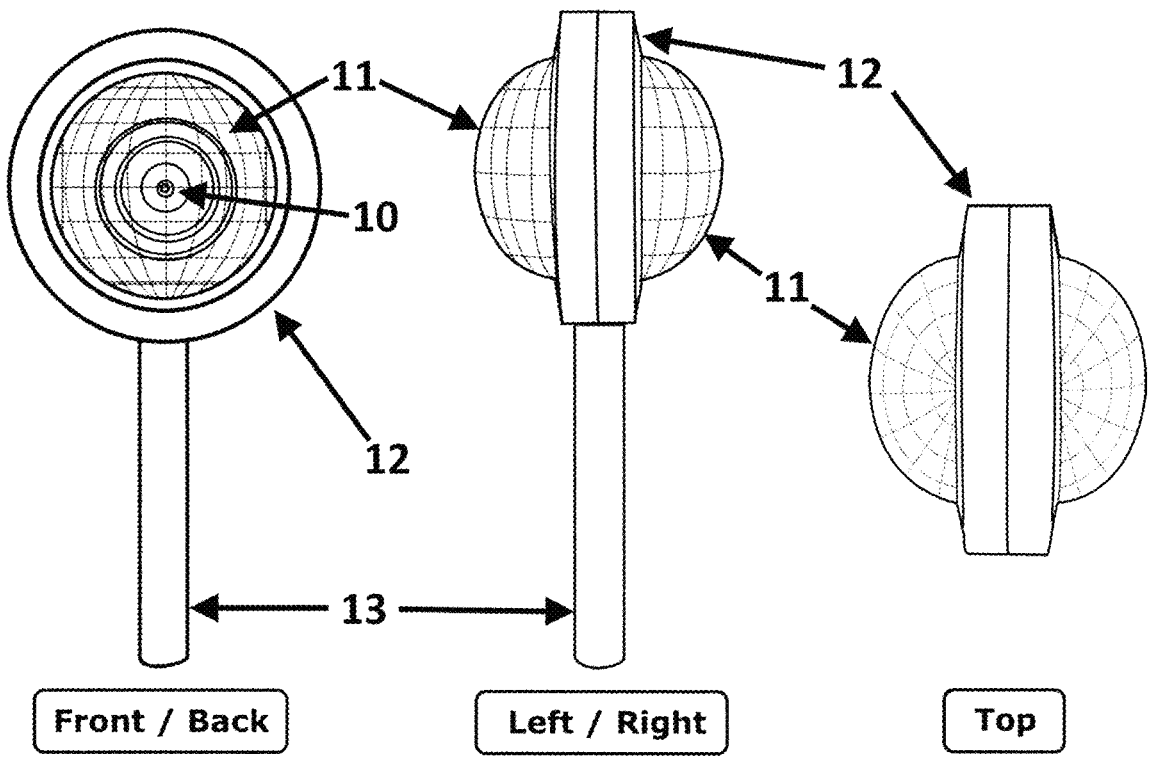
FIG. 5 shows a double fisheye camera system hardware design.

Referring now specifically to FIG. 5, a double fisheye camera system with two fisheye cameras (10) could be housed in back-to-back adjoining, clear dome enclosures (11), with the area between the two cameras (12) reserved for housing the required electronics and circuitry. The clear dome enclosures (11) ensure that the fisheye cameras (10) have full visibility of the surrounding area and full protection from environmental hazards. A mounting post (13) attached to the non-viewing portion of the enclosure would allow for elevated mounting away from the surface of the vehicle.

Figure 6:
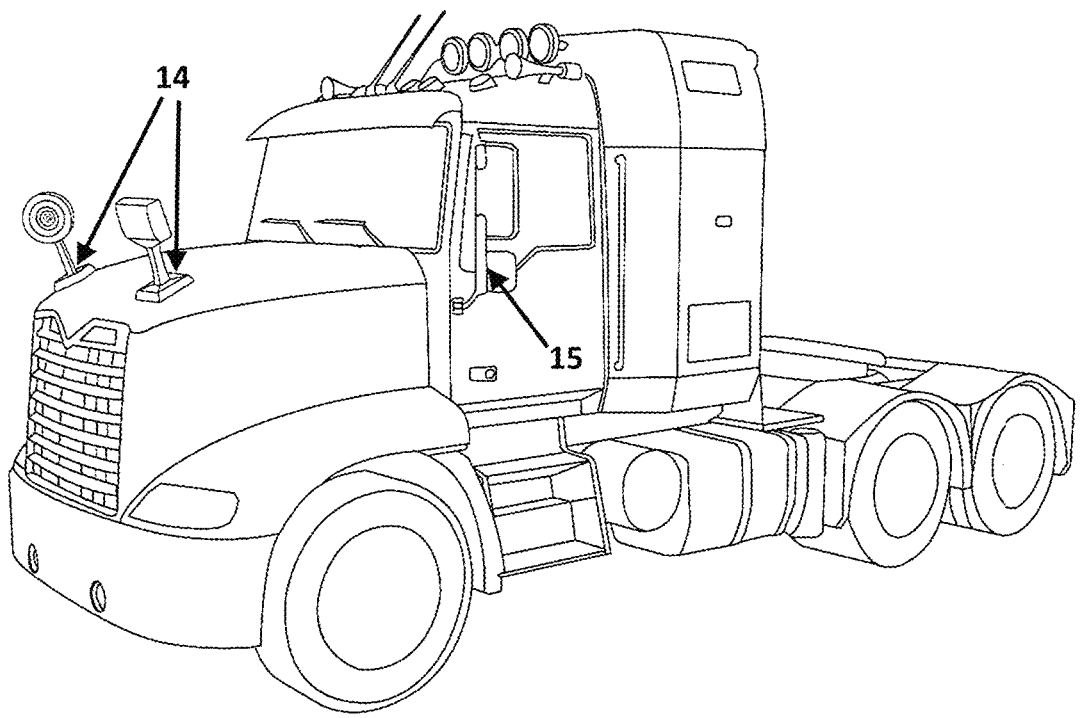
FIG. 6 shows the fender mounting positions on the tractor unit in a tractor-trailer pair where a double fisheye camera system could be located, shown here on the passenger side.

Referring now specifically to FIG. 6, in heavy duty vehicle operation, a double fisheye camera system with two image sensors could provide an omnidirectional view at a number of critical areas on the vehicle. One embodiment of the proposed system would be located at the front fender of the vehicle on the passenger side. This vantage point can provide a view of both the front and side of the vehicle simultaneously. In addition, this camera could provide views of the driver when lighting conditions/glare through the windshield allow. Both the front and side of the vehicle are plagued with blind spots where unaided driver visibility cannot reach. Visibility of the area on the passenger side of a heavy truck is critical to the driver; seeing this area allows for better navigation of lane change and merge maneuvers on the highway. During in-city operation, this double fisheye camera system can provide visibility of the area next to the front fender and in front of the vehicle hood. These areas can fully conceal pedestrians, cyclists, and other small vehicles without the driver's knowledge. The individuals concealed in these blind spots are sometimes injured or killed when the vehicle moves forward or performs a right-hand turn.

Another issue faced during in-city driving is ensuring that the trailer's rear tires clear obstacles such as curbs when making turns. The wide viewing angle of this camera system could maintain vision of the rear trailer wheels even during vehicle articulation. Using computer vision analysis, the view displayed to the driver in the in-cab monitor could automatically track the rear wheels when the vehicle is travelling under a threshold speed and/or the right turn signal is activated. In parking/backing situations, the view this camera system provides can be used to judge clearances even when the trailer is at an articulated angle. This contrasts with comparable mirror systems that can lose sight of the rear of the vehicle when the trailer is articulated out of line with the tractor. Additional sensors such as radar could also be incorporated into the design of the fisheye camera system. These could be leveraged to provide an additional means to detect pedestrians, cyclists, and motorcyclists in imminent danger due to their proximity to the vehicle.

To enable installation at the fender, the double fisheye camera system=s mounting post (13) could incorporate an attachment point to accommodate mounting to the standard fender mirror mounts (14) common to heavy duty vehicles. The joint connecting the mounting post (13) with the fisheye camera enclosure could be fixed or adjustable, so that the angle of capture could be aimed to maximize image resolution at key observation zones. The double fisheye camera system's power transfer and data communication can be carried out over a wired cable connection run to a power source and display/modem respectively. Alternatively, the system could wirelessly transmit and receive data if a wireless transmitter/receiver is incorporated. The captured spherical imaging data (9), once dewarped and flattened, could be communicated as video to the driver in a variety of display types including a typical dash-mounted display (approximately 16×9 aspect ratio), rearview mirror-style wide screen display (approximately 16×11 aspect ratio), or even a heads-up display. The viewing area displayed to the driver could be manually set by the driver or fleet operator or automatically responsive to a combination of vehicle controls (steering input, turn signal, etc.) and vehicle status information (operating gear, vehicle speed, etc.). Such an in-cab display could also contain a camera for driver behavior monitoring and recording.

The double fisheye camera system could, alternatively, be mounted on the passenger side "west coast mirror" arm (15) that holds the truck's side view mirror. This vantage point can provide a view of the entire side of the vehicle. This side view, when compared to the side view provided by the single fisheye camera system mounted directly to the side of the vehicle, provides a perspective that is further outboard of the vehicle. This ensures that no protruding tractor or trailer geometry can impede the view down the side of the vehicle. Mounting this camera device off of the mirror arms (15) as an add-on product could be accomplished using a two part tube clamp bracket incorporated into a shortened mounting post (13) or through other means.

Figure 7:
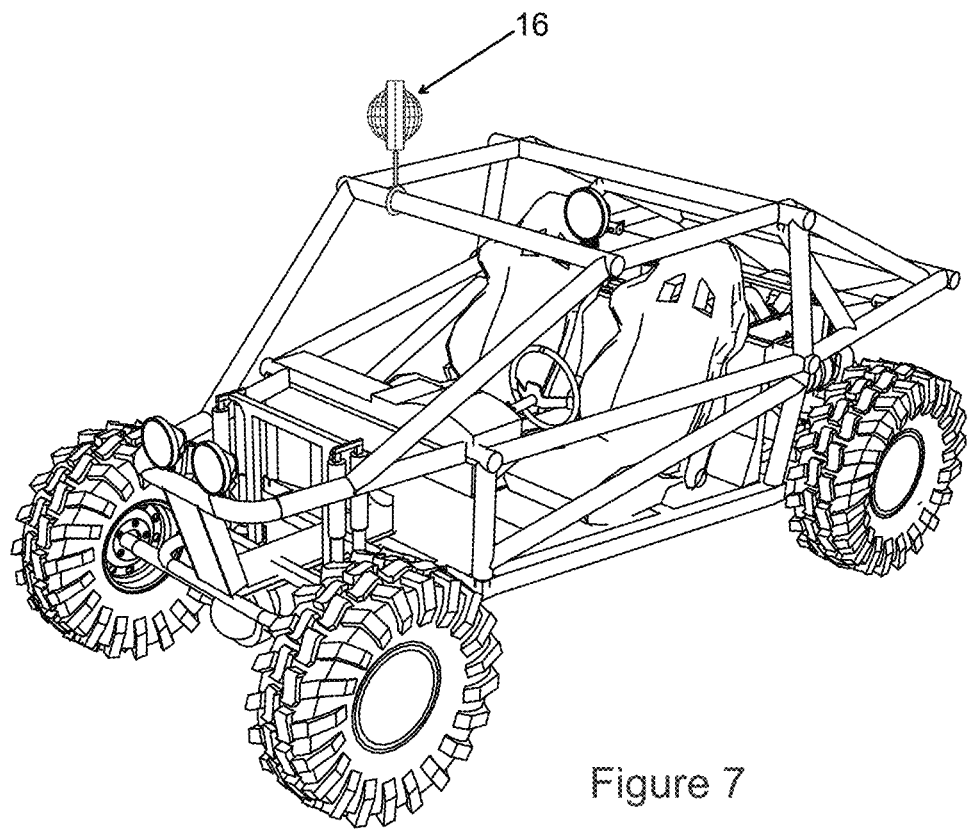
FIG. 7 shows a double fisheye camera system located on the frame of an offroad vehicle.

Referring now specifically to FIG. 7, the double fisheye camera system could, alternatively, be mounted on the frame of an offroad utility vehicle or ATV. This could be accomplished by using a two part tube clamp bracket incorporated into a shortened mounting post (13) or through other means.

Figure 8:
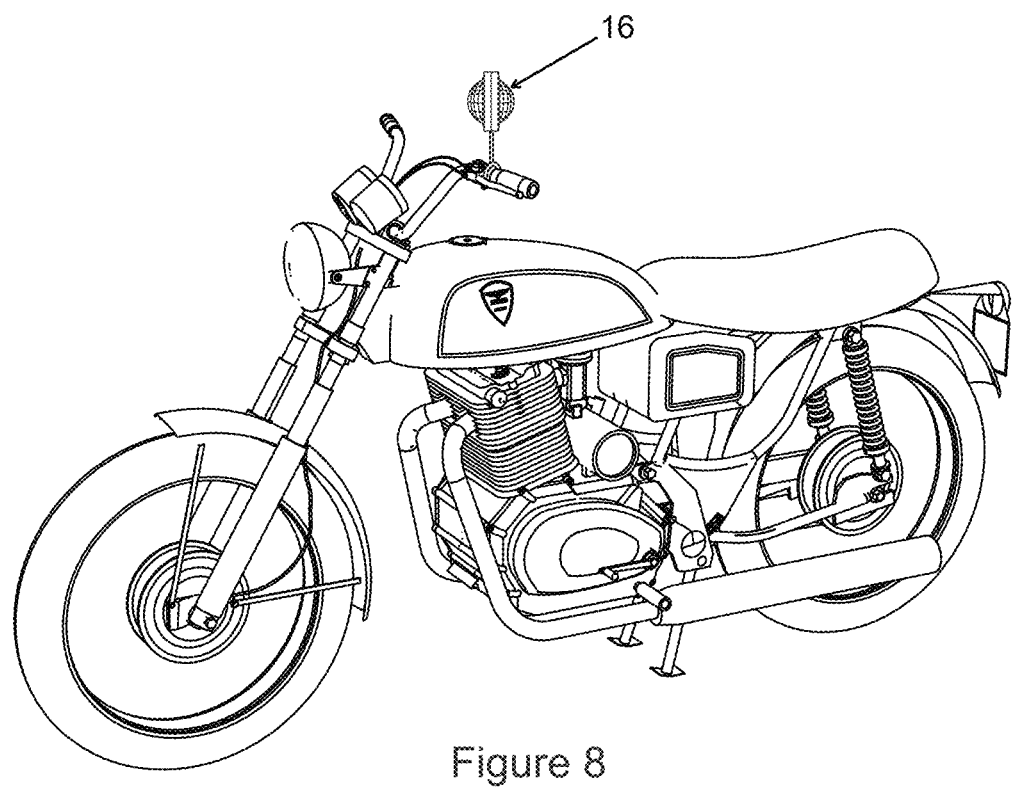
FIG. 8 shows double fisheye camera system located on the handlebar of a motorcycle.

Referring now specifically to FIG. 8, the double fisheye camera system could, alternatively, be mounted on the frame or handlebars of a motorcycle. This could be accomplished by using a two part tube clamp bracket incorporated into a shortened mounting post (13) or through other means.

Figure 9:
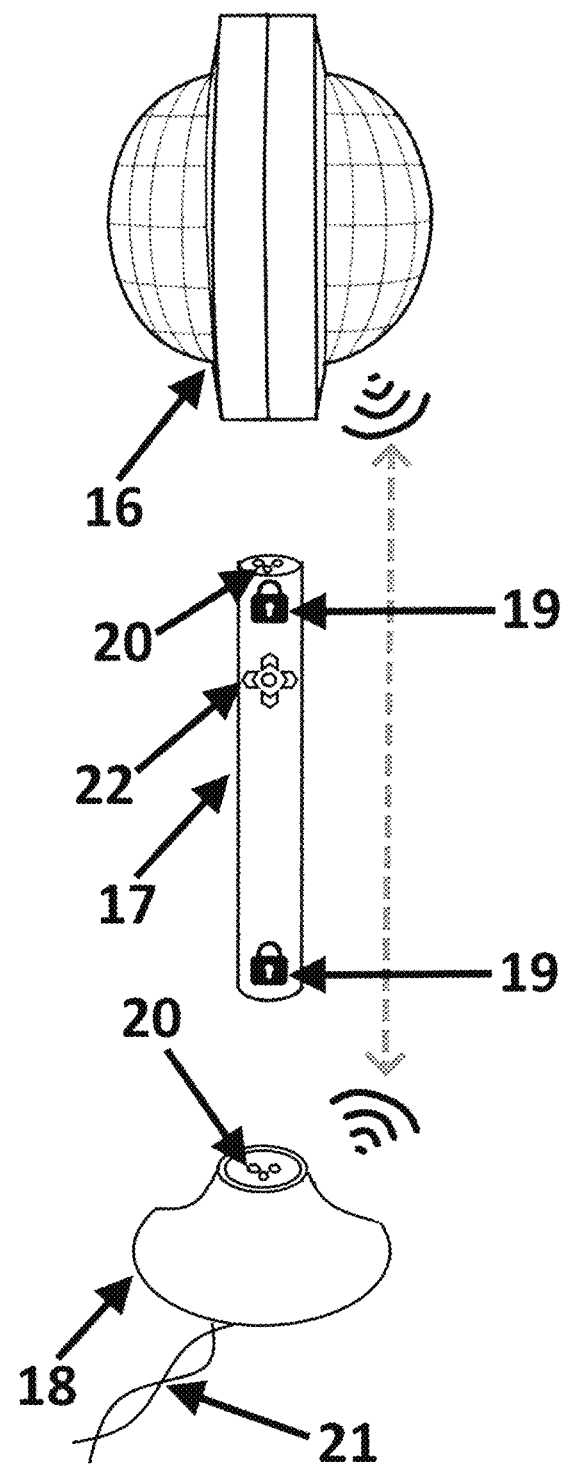
FIG. 9 shows a modular sensor unit mounting and communication apparatus.

Referring now specifically to FIG. 9, modular versions of the double fisheye camera system described in FIGS. 5 to 8 could be implemented to increase flexibility of features, installations, and repairs. In general, the modular sensor unit mounting and communication apparatus depicted in FIG. 9 can be used to monitor, record, and communicate data gathered from the vehicle and surrounding area. The sensor unit (16) is independent from one or more intermediate mounting members (17) and the base bracket (18). These modular components detachably mount together; they can be secured to one another with standardized fittings and removed when needed. A keyed, combination, magnetic, or mechanical quick release locking mechanism (19) can be incorporated into the design to disincentivize theft of the system components.

The sensor unit (16) contains one or more components to measure or record the surrounding environment, which could be one or multiple fisheye cameras. In addition to, or as a replacement for, the fisheye camera array, other sensors such as digital camera, radar, lidar, ultrasonic, proximity, photo-sensor, humidity, vibration, gyroscopic, accelerometer, temperature, pressure, airspeed, motion, gas detection, acceleration, microphone, compass, hall effect, GPS, or road condition sensors can be included as part of the sensor unit (16).

The varied sensors above can be used to drive additional system functions. For instance, an incorporated radar or lidar sensor could be used to detect vehicles in the adjacent lane and communicate a warning to the user. Proximity sensors, motion sensors, or accelerometers could be used to detect activity around the vehicle and trigger a security alarm or trigger a wake-up response to exit a power saving operational state. Computer vision analysis of the data captured by any included fisheye cameras could also be used to trigger the above responses. A photo-sensor could help dynamically adjust camera capture settings such as exposure in response to changes in lighting conditions. Humidity, temperature, gas, and road condition sensors could drive a suite of environmental condition features to help the driver or the vehicle to operate more safely or efficiently.

Not only are the sensor unit (16), intermediate mounting member (17), and base bracket (18) mechanically secured together, but electrical and communication connections (20) can also be incorporated seamlessly into the design of the modular pieces=mating parts. This could be accomplished by incorporating electrical contacts or pins into the mating parts. Alternatively, inductive coupling could be used to pass electrical and communication connections (20) between the modular pieces.

The modular design of this system would allow for independent operation of the sensor unit (16) by removing the connection from either the intermediate mounting member (17) or the base bracket (18). If removed from the intermediate mounting member (17), then the sensor unit (16) would operate fully independently. Accessories such as tripods could be fit to carry the sensor unit (17) for ease of capture and handling.

However, there are potential advantages to removing both the intermediate mounting member (17) and the sensor unit (16) from the base bracket (18) as a combined subassembly. A battery pack could be housed within the intermediate mounting member (17) to supply additional power to the sensor unit (16) while it is detached from the hardwired connection (21) at the base bracket (18), which would supply power while mated together. This battery connection is especially useful for using the modular sensor unit as part of a vehicle security system when the vehicle keyed power is not being supplied. The intermediate mounting member (17) could also be equipped with controls (22) for user input and control of the system functions, such as entering or exiting a low power state, flagging gathered data, or performing a reset of the system. The intermediate mounting member (17) can also be used as a handle to assist the use and transport of the sensor unit (16).

The base bracket (18) is fixed to the vehicle; this could be at a variety of mounting positions, including the fender mirror mounts (14), west coast mirror arm (15), and others. The base bracket (18) could articulate or rotate to better aim the sensor unit (16) and for strain relief or shock absorption to protect the system from impact damage. Mounting positions with easy access to hardwired connections (21) to power and communication circuitry would be advantageous.

If the vehicle uses a different voltage than required by the modular sensor system, then power conversion hardware could be incorporated into the base bracket (18) to normalize the power being supplied. The communication circuitry could refer to two primary sources: the vehicle data bus or the vehicle telematics system/event data recorder. The vehicle data bus would provide access to vehicle information such as engine hours, operating gear, odometer, speed, VIN, fuel level, ADAS alerts, engine RPM, throttle position, diagnostic codes, airbag status, and braking activation. This information would be valuable to associate with the data gathered by the sensor unit (16) for a richer understanding of the situation being measured.

The vehicle telematics system and any associated event data recorder would be another route for communication to flow. Not only will a vehicle telematics system provide a data connection to cellular or other wide area network communication with the cloud, but these systems often have their own connection to the vehicle data bus. This indirect data bus connection can be used to achieve many of the same functions that a direct connection to the vehicle data bus could deliver. Information gathered by the sensor unit (16) can be stored in the memory of the telematics or event data recorder system. Additionally, some or all of this data can be uploaded to remote cloud servers for driving incident investigation, driver coaching, and operational analysis.

When the sensor unit (16) is detached and being operated away from the vehicle, the system could still associate vehicle data bus and telematics system data with the data being collected by the sensor unit (16) in several ways. One of those methods would be to create a buffer of data stored on a memory device on the vehicle side, and synchronize the two data sets once electrical connection to the vehicle is reestablished. Alternatively, the vehicle data bus and telematics system data could be broadcast over a wireless connection between the sensor unit (16) or the attached intermediate mounting member (17) and a transmitter incorporated into the base bracket (18) or the vehicle telematics system.

Figure 10:
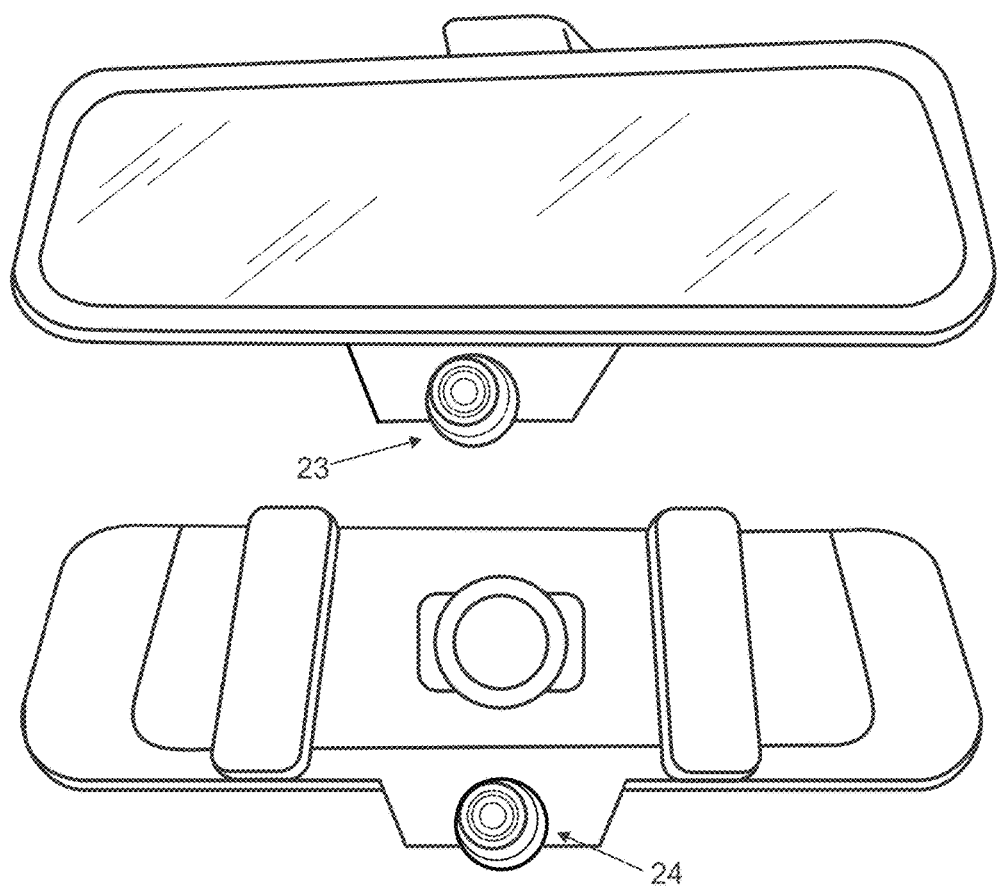
FIG. 10 shows a double fisheye camera system located on the windshield mounted rearview mirror.
Figure 11:
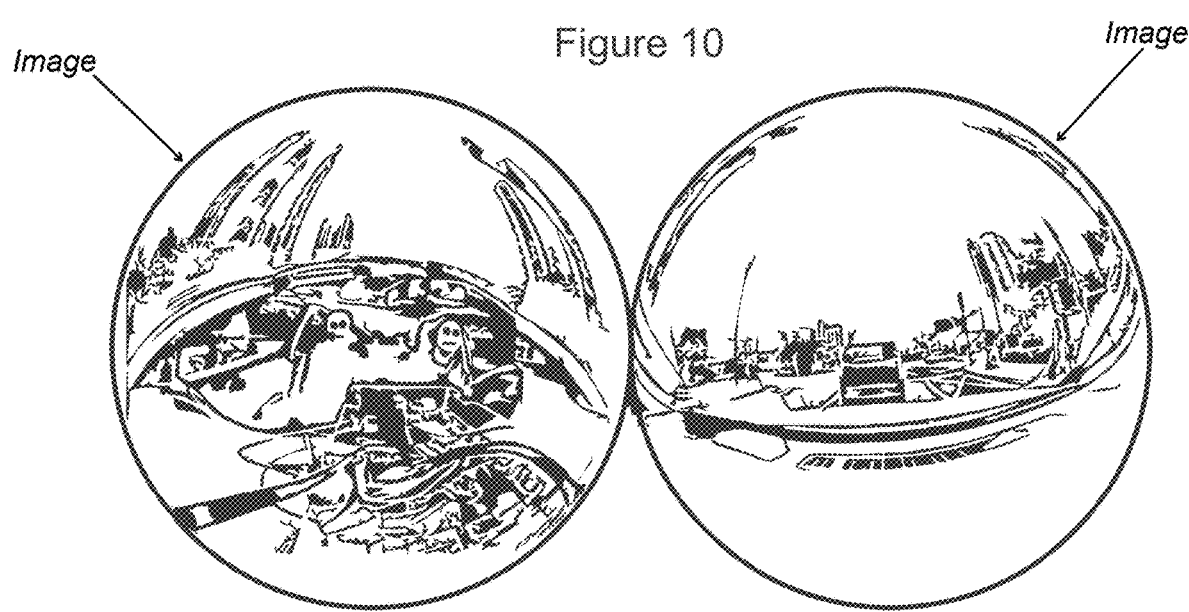
FIG. 11 shows the use of two fisheye cameras in a back-to-back array, combining to capture two adjoining hemispherical views, which can be stitched together to form spherical imaging data.

Referring now specifically to FIGS. 10 and 11, another embodiment of the double fisheye camera system with two image sensors, an interior mounting system inside the windshield of the vehicle could be used to capture both interior and exterior views of the vehicle environment. This mounting could be incorporated into the design of a rearview mirror. The occupant facing image sensor (23) is directed inward toward the passenger compartment, and the road facing image sensor (24) is directed out toward the windshield, hood, and road. Both of these image sensors (23, 24) could be fisheye cameras gathering hemispherical imaging data (4) which can be stitched together to form spherical imaging data (9). FIG. 11 shows two such hemispherical images captured interior of the vehicle and the exterior of the vehicle.

A mirror and/or display can be incorporated into the windshield mounted design in order to replace the existing rearview mirror in light/medium duty vehicles, or to add new utility in heavy duty vehicles which are not usually equipped with rearview mirrors. To provide a rearview functionality in these heavy duty vehicles with no rear window, an external camera input can be included. Video from this exterior rearward facing camera could be displayed while the vehicle is in reverse only, or video from the rear of the vehicle can be displayed during normal vehicle operation. This would allow the driver to track approaching vehicles, judge clearance for overtaking vehicles and merging, as well as back up to trailers or docks more easily.

The occupant facing (23) and road facing (24) fisheye cameras are exposed to very different lighting conditions, and must be able to present a unified omnidirectional view of the environment both inside and outside of the vehicle. Fortunately, image processing is possible to normalize the difference in exposure between the two sensors such that a cohesive stitched view can be presented once the dewarping and flattening process is carried out. Unlike the cameras mounted on the exterior of the vehicle, that can rely on rapid air flow in the environment to help with thermal management, this interior mounted device will need to efficiently output waste heat from its electronics as well as radiative heat it takes in from sunlight. To achieve adequate thermal management, a heatsink is incorporated into the windshield-facing side of the system. If necessary, a small fan can be incorporated into the design to provide airflow and additional heat exchange across the incorporated heatsink. The ultrawide capture angle of the camera, combined with its fixed aim construction, prevents a driver from simply aiming the camera away from themselves to avoid monitoring. This is helpful in coaching and compliance, as resistance to monitoring while in the workplace has been a persistent problem facing companies seeking to increase safety and accountability through driver monitoring and coaching.

Data gathered by the various embodiments of sensor systems described above can be augmented with location and time information from GPS equipment collocated with the camera or sensor devices or associated with the vehicle telematics system or vehicle data bus. This time and location information would be essential to correlate the sensor system's gathered imaging and sensor data with in order to add context to data reports made to a central data repository. Additionally, GPS equipment could determine when the vehicle is stationary, only then enabling security features to ward off individuals detected by camera or other sensors. Warning lights and horns could be used to alert suspects and ward them off, and an incident report with video, GPS location, and other data can be sent to the fleet operator, driver, or the relevant authorities. This video data could be processed to carry out facial recognition to prevent false activation when an authorized individual approaches the vehicle, and also to potentially identify unauthorized individuals.

The previously described sensor systems could be equipped with atmospheric and road condition sensors. These would allow for detection of data such as ice buildup on the road surface, ambient temperatures, ambient pressures, and ambient humidity. This information can be used to inform driving decisions, but just as importantly to provide valuable data to a central data repository as described in the United State patent application with publication number US 2022/0390254, which is incorporated here by reference. In addition to this atmospheric and road condition information, digital mapping information gathered by cameras, radar, and other incorporated sensors can be uploaded to the central data repository, tagged with time and location data of the event obtained from GPS. These sensors capture valuable information such as traffic conditions, road conditions, infrastructure condition, stop light status, digital mapping of the surrounding environment, surrounding street signs, pedestrian presence, erratic drivers in the area, etc. This data, and data obtained from a distributed network of sources, can be leveraged for mapping, reporting traffic incidents, detecting changes or deterioration in infrastructure, etc. Data obtained from this repository can provide a valuable baseline for comparing to data currently being collected by the system such that exceptional conditions can be detected and potential hazards avoided by the driver due to enabled safety alerts.

These alerts can be provided not only to the driver of the vehicle immediately involved in the hazard, but to those vehicles in the direct vicinity as well through use of a mesh network. This method of communication involves a network of indirectly connected nodes, which pass information from one connected node to another such that communication between two nodes which are remote from one another is made possible. This type of network could be established from vehicle to vehicle, or vehicle to infrastructure using the designated Dedicated Short Range Communications (DSRC) wireless band, or alternatively the 2.4 GHz band. If using the 2.4 GHz band, ranges of approximately three hundred feet can be expected. These ranges are comparable to WiFi communications which utilize the same frequency band. This range is limited but comes with none of the monthly fees associated with cellular networks. This low bandwidth nature of communication is sufficient for passing the types of messages described here. This mesh network provides an alternate path for data communication from one of the display, fisheye camera, or trailer cameras systems. If a fleet operator of sufficient size implemented such a mesh network, their vehicles would be able to locate and notify the fleet operation center when they come into proximity with lost or stolen equipment so that it can be recovered. Communication between a fleet vehicle and a piece of lost or stolen equipment could create a log event noting the location, time, duration of connection, and the identity of the asset encountered. This fleet-wide mesh network could also be used to provide data communications to the fleet operation center for other fleet vehicles that are not equipped with cellular communication systems, or whose cellular communication systems are disabled or have a poor connection. These vehicles can also warn surrounding vehicles of upcoming hazardous road, traffic, and weather conditions.

In addition to the above applications, such a mesh network communication system could be linked to vehicle security systems and used to deliver alerts to vehicle drivers, vehicle owners, and/or security monitoring services. When a vehicle security system is in an armed state, the triggering mechanism of said security system could be activated by proximity sensors, accelerometers, glass break sensors, video analysis software monitoring vehicle camera data, etc. When activated by any of the above methods, the vehicle can respond not only by activating visual and audible warnings using the vehicle horn and lights, but also begin to transmit an alarm signal over the mesh network of connected vehicles and infrastructure in the environment. If any of these nodes are equipped with cellular or data connections, this information can be passed to a cloud server for wider distribution. This data distribution can be routed to the vehicle owner, fleet management, and law enforcement authorities. This remote alert could be delivered via text message, email, automated phone call, etc. The structure of the mesh network enables data delivery to relevant parties in proximity to the activated vehicle (within X nodes of the activated vehicle) to provide a faster response time to the alarm. In addition to the visual and audible warnings activated at the vehicle, any sensor and video systems in the car can be activated to record the vehicle interior and surrounds for later forensic analysis.

In the heavy duty vehicle market, tractor trailers driving on highways consume a large amount of fuel due to their speed of travel and the exponential increase in drag associated with increased speed. One method to increase operational efficiency of multiple tractor trailers traveling together is through platooning. Platooning involves each of the vehicles travelling in a single file line to "draft" behind one another, greatly reducing the force needed to push through the air resisting vehicle travel. Even in the lead vehicle, efficiency gains are realized due to reduced aerodynamic turbulence. In order to safely carry out platooning operation, each vehicle needs reliable communication with the other vehicles involved, as control information, such as braking, steering, and acceleration, needs to be passed between the vehicles. The mesh network concept described above could fulfill an essential role in platoon configuration, setup, requests, acceptances, and control. Even if a higher bandwidth communication protocol is needed to pass the braking, steering, and acceleration control between the platooning vehicles, the described mesh network could fulfill the administrative tasks necessary to initiate vehicle platooning.

For the purposes of describing and defining the present invention it is noted that the use of relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under 35 U.S.C. '112(f) [or 6th paragraph/pre-AIA] is not intended. Additionally, it is not intended that the scope of patent protection afforded the present invention be defined by reading into any claim a limitation found herein that does not explicitly appear in the claim itself.

What is claimed:

1. A system for capturing omnidirectional imaging data comprising:
    a sensor unit comprising:
        an array of two or more digital cameras, each adapted for capturing subspherical imaging data; and
        a processor operatively connected to said array of digital cameras and adapted for combining said subspherical imaging data into spherical imaging data;
    said sensor unit detachably mounted to an intermediate mounting member;
    said intermediate mounting member comprising:
        a substantially hollow body; and
        a battery pack;
    said intermediate mounting member detachably mounted to a base bracket.

* * * * *